United States Patent [19]

France

[11] Patent Number: 5,083,597
[45] Date of Patent: Jan. 28, 1992

[54] LOCK RING GROOVE SUPPORT FOR DUAL TIRE RIMS

[75] Inventor: Jimmie J. France, Roanoke, Ill.

[73] Assignee: Komatsu Dresser Company, Libertyville, Ill.

[21] Appl. No.: 519,006

[22] Filed: May 4, 1990

[51] Int. Cl.$^5$ .............................................. B60B 25/14
[52] U.S. Cl. .............................. 152/410; 301/13 SM
[58] Field of Search ........................... 152/409, 410; 301/13 SM, 36 R

[56] References Cited

U.S. PATENT DOCUMENTS

| | | |
|---|---|---|
| Re. 30,036 | 6/1979 | DeRegnaucourt ............ 301/13 SM |
| 1,966,823 | 7/1934 | Miller .......................... 301/13 SM X |
| 1,982,057 | 11/1934 | Jobski ........................ 301/13 SM X |
| 2,152,757 | 4/1939 | Burger ........................ 301/13 SM X |
| 2,599,248 | 6/1952 | Forbes et al. ............... 301/13 SM X |
| 3,009,742 | 11/1961 | Rabe et al. .................. 301/36 R X |
| 3,224,474 | 12/1965 | Smith . |
| 3,421,797 | 1/1969 | Walther ........................ 301/13 SM |
| 3,623,772 | 11/1971 | Walther ........................ 301/13 SM |
| 3,837,709 | 9/1974 | Williamson .................. 301/13 SM |
| 3,847,442 | 11/1974 | Masser ........................ 301/13 SM |
| 3,885,615 | 5/1975 | Mitchell . |
| 4,142,569 | 3/1979 | Walther .................. 301/13 SM X |
| 4,363,347 | 12/1982 | Baumgartner . |
| 4,530,387 | 7/1985 | Osawa . |
| 4,721,142 | 1/1988 | Foster . |
| 4,743,070 | 5/1988 | Henke et al. ................. 301/13 SM |

FOREIGN PATENT DOCUMENTS

| | | |
|---|---|---|
| 505052 | 3/1930 | Fed. Rep. of Germany ........ 301/13 SM |
| 691292 | 10/1930 | France .......................... 301/13 SM |
| 57-158102 | 9/1982 | Japan . |
| 2067482 | 7/1981 | United Kingdom . |

OTHER PUBLICATIONS

Unirim (TM), Unit Rig & Equipment Co., 1987.

Primary Examiner—Russell D. Stormer
Attorney, Agent, or Firm—Richards, Medlock & Andrews

[57] ABSTRACT

A dual rim assembly structure adapted to reduce cracking of gutter bands. An annular support wedge is disposed against an inclined surface to provide support under the lock-ring groove and reduce bending forces in the gutter band of each rim. A cylindrical spacer having annular tapered edges defines the support wedges. The spacer is disposed between the dual rim assemblies so that when the outer rim assembly is fixed to the hub, a lateral force is applied which forces the wedges of the spacer into engagement with the respective inclined surfaces of the gutter bands, thereby supporting both the inner and outer rim assemblies.

11 Claims, 2 Drawing Sheets

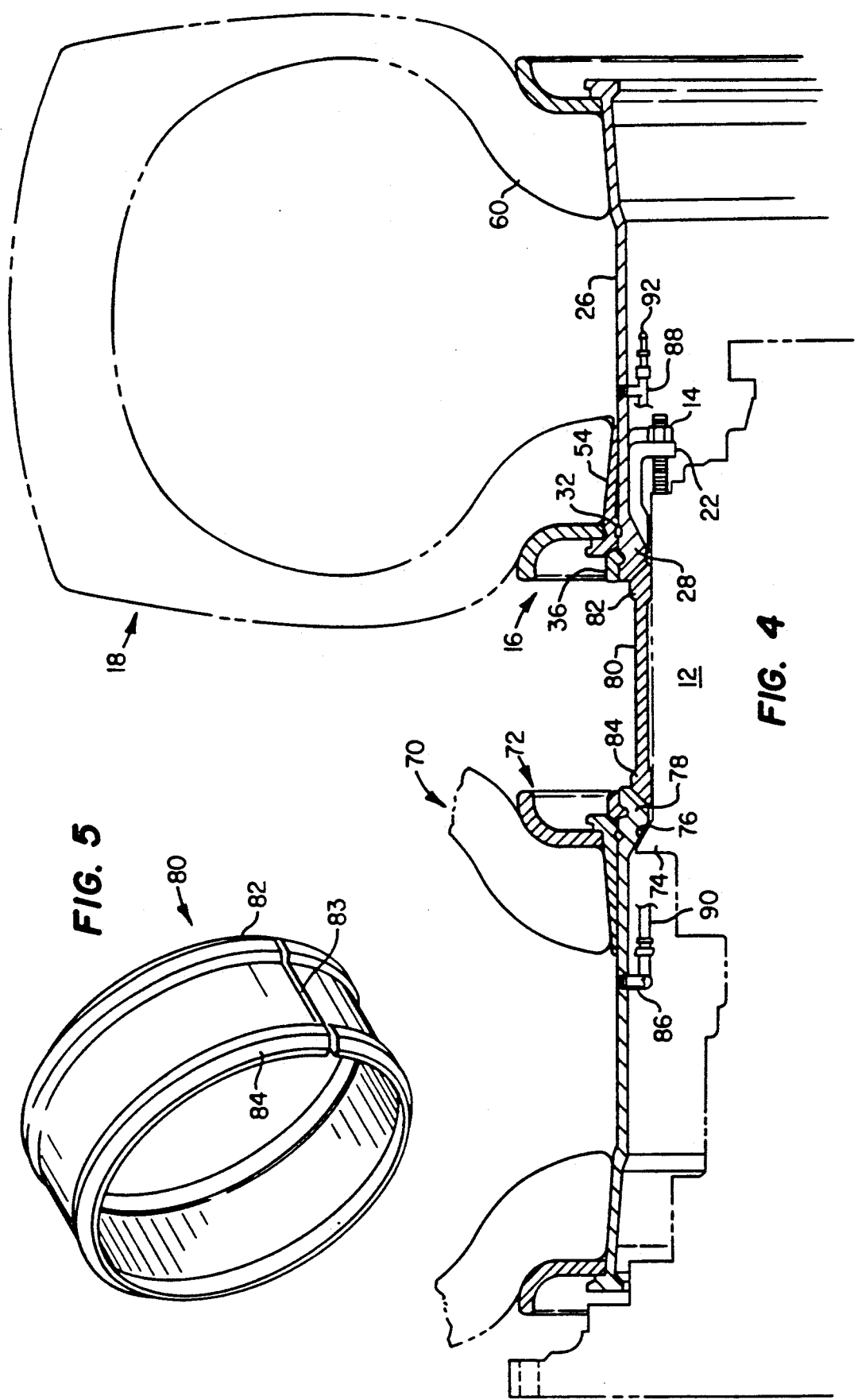

LOCK RING GROOVE SUPPORT FOR DUAL TIRE RIMS

BACKGROUND OF THE INVENTION

Pneumatic rubber tires, whether of the tube or tubeless type, are commonly mounted on rim structures which, in turn, are bolted or otherwise fastened to a rotatable hub. When employed in conjunction with passenger cars, or the like, the bead structure of the tires is sufficiently flexible so as to be distorted and mounted over the flanged part of a unitary structure rim. However, in larger vehicles, such as trucks and earthmoving equipment, the tire beads are very stiff and would require massive equipment to install them over the sidewall flange part of the rims without causing damage to the bead structure. Drop center rims have been made for large earth moving tires, but have not presently met with success or acceptance. Therefore, in such cases, the rims are constructed of at least one removable sidewall flange for facilitating the mounting and the demounting of a tire therefrom.

A rim having a removable sidewall flange and of the type especially adapted for use with heavy duty equipment is disclosed in U.S. Pat. No. 4,721,142, by Foster. The rim structure of the noted patent greatly facilitates the mounting and demounting of tires thereon. However, certain structures of the rim experience extremely high bending forces during road use and thus are susceptible to the development of cracks. This can be appreciated, in view that vehicles employing such type of rims can carry in excess of 200 ton loads.

More particularly, rims having a removable sidewall flange often include a gutter band ring with a groove into which a lock ring is locked to thereby fasten the sidewall flange with respect to the rim. The manner in which the gutter band portion of the rim is supported with respect to the hub subjects the gutter band to large bending forces, often resulting in cracking of the gutter band in the annular lock ring groove. The gutter band is generally not supported on its bottom surface thereof, under the outer annular groove in which a locking ring is locked. Thus, the lateral forces exerted by the sidewall rim structures on the lock ring exert a corresponding lateral force on the gutter band groove, thereby weakening the gutter band adjacent the groove, fatiguing it, and eventually cracking such structure.

The danger attendant with a crack in the gutter band is manifest during removal of the rim by repair personnel or workmen. During removal of the rim of the type noted, mounting wedges which wedge the rim onto a hub are removed from the hub, thereby allowing the lateral tire pressure to completely split the gutter band. In such an event, the tire pressure is either explosively discharged, or other parts of the rim can break, whereupon the rim and tire is essentially explosively blown off the vehicle. In either case, the danger to workmen removing such types of tires is great, and injuries can be fatal.

The foregoing problem has been addressed to a certain extent by the rim structure disclosed in U.S. Pat. No. 4,530,387 by Osawa. Disclosed in such patent is a dual taper rim structure which provides support for the gutter band groove and reduces the likelihood of cracking. However, such rim structure is especially adapted for single rim hubs, and thus does not provide a solution or remedy for vehicles utilizing dual rims. It can be appreciated that dual rim wheel assemblies are utilized on vehicles carrying extremely large loads, which situations create rim stresses and forces more likely to cause cracking of the components of the rim assembly.

From the foregoing, it can be seen that a need exists for an improved dual rim structure having rims with removable sidewall flanges, and of the type in which gutter band cracking is substantially reduced or eliminated. Another need exists for an improved dual rim structure which is readily adaptable to existing rim structures, and which reduces large bending stresses imposed thereon by heavy loads.

SUMMARY OF THE INVENTION

In accordance with the present invention, a support is provided to the gutter band portions of dual rim structures so as to substantially reduce bending forces adjacent the outer annular lock ring grooves and thereby subject the gutter band to shear forces. The improved dual rim structure of the invention can sustain substantially higher shear forces adjacent the gutter band lock ring grooves and thereby substantially reduce or eliminate cracking thereof.

In accordance with the preferred embodiment of the invention, an annular surface of the gutter band edge of each rim, under the outer annular lock ring grooves thereof, are not left unsupported, but rather are configured with respective dual inclined surfaces. An annular spacer ring, being cylindrical shaped, and having opposing annular edges with tapered surfaces is situated between the dual rims and held in compression between the inclined surfaces of the opposed dual rims. The other inclined surface of the inner rim is wedged against an inclined surface machined within the wheel hub, while the other inclined surface of the outer rim is wedged with plural mounting wedges bolted to the hub.

Thus, a single cylindrical spacer ring with tapered annular edges is effective to provide the support to the gutter band groove area of both rims, and simplify the mounting of the dual rims to a hub.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts or elements throughout the views, and in which:

FIG. 4 is a cross-sectional view of the rim apparatus employed for use with dual rims; and FIG. 5 is an isometric view of a cylindrical spacer ring constructed in accordance with the preferred embodiment of the invention.

DETAILED DESCRIPTION OF THE INVENTION

Figure 1:
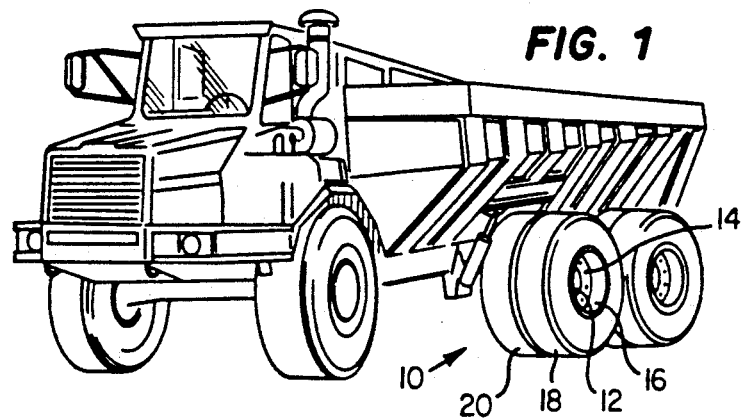
FIG. 1 illustrates an earth moving vehicle of the type with which the invention is highly advantageous.

FIG. 1 is illustrative of one application in which the invention can be advantageously practiced. Shown is a heavy equipment truck adapted for carrying extremely heavy loads, in the 100–240 ton range. Such equipment is typically utilized in carrying dirt, minerals and the like. While the invention is illustrated and described herein in connection with heavy truck equipment, the invention itself is not limited to such equipment, but may find numerous applications with other vehicles.

Trucks of the type shown in FIG. 1 include large load-bearing rear, dual wheels 10, each mounted to a hub 12 for providing mobility to the truck. In heavy equipment applications, the hub 12 may be of the electrical type, driven by a large electric motor. The hubs of smaller trucks and vehicles are typically fastened to an axle which is driven by a differential gear assembly. Conventional electrical hubs 12 include a number of bolts 14, typically numbering 16-18, which fasten the outer tire rim 16 to the hub 12. By tightening the bolts 14, the outer rim 16 axially compresses against the inner rim (not shown) and thereby fixes both such rims and associated tires to the hub 12.

Mounted on each rim 16 are heavy duty tires 18 and 20 which can withstand the load of the truck, as well as the rough terrain over which the truck travels. In order to withstand loads of the type noted above, the rims 16 can be over 57 inches in diameter, while the tires 18 and 20 may have a diameter of over 8 feet, with a width in excess of 40 inches. It can be appreciated that with such large equipment, reliability is extremely important, both as to personnel as well as in terms of cost.

As noted above, heavy and light duty rims 16 are often constructed with at least one removable annular sidewall flange so that the mounting or demounting of the tire 18 can be facilitated. However, and as noted above, the rim apparatus which allows removability of the annular sidewall flange includes an inherent weakness which can lead to fatigue and/or cracking of the rim elements. Reference is made to U.S. Pat. No. 4,721,142 for an illustration of a heavy duty vehicle rim structure. It is to be noted that cracking can occur at the bottom of the annular lock ring groove, primarily because the area of the gutter band generally under such groove is unsupported. In practice, the gutter band is raised somewhat above the hub when tightened thereto, and thus the hub itself provides no support. In other instances, the edge of the gutter band overhangs the hub, and thus remains unsupported. Reference is also made to the Osawa patent identified above which addresses the problem and provides a solution to single rim structures.

Figure 2:
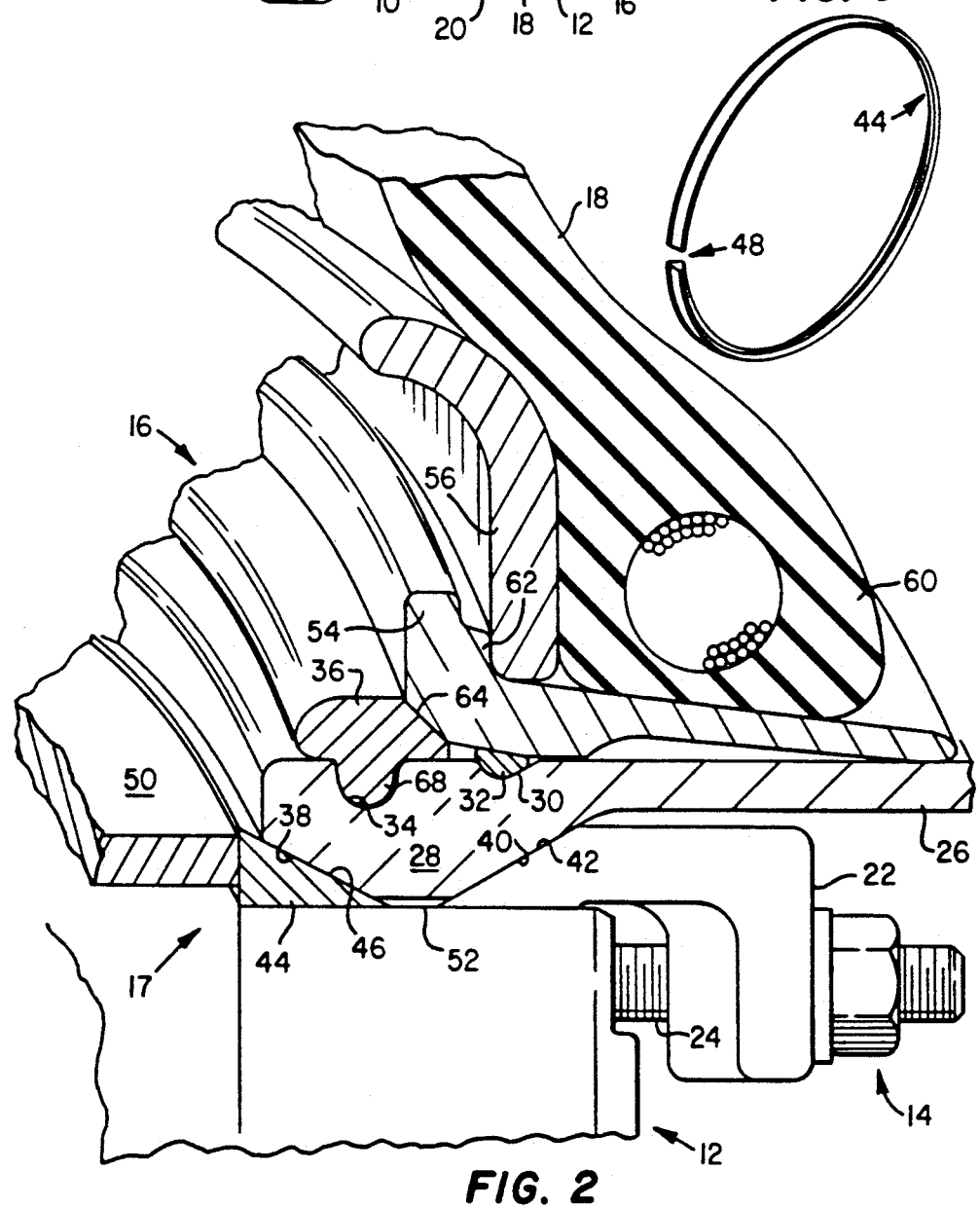
FIG. 2 is a partial cross-sectional view of the rim of the invention having the improved gutter band support.

FIG. 2 depicts a partial sectional view of a rim assembly having a removable side ring flange, and otherwise constructed in accordance with the invention. Only a portion of the outer rim assembly 16 is shown, it being understood that an inner rim is held in compression therewith by way of a cylindrical spacer assembly 17. The outer rim assembly 16 is mounted to the hub 12 by one or more mounting wedges 22 fastened to the hub 12 by corresponding bolts 14. The bolt stud 24 passes freely through a hole (not shown) in the mounting wedge 22 and is threadably engaged in threaded holes within the hub 12. While the mounting wedge 22 can be a single annular-shaped ring of the cross section similar to that shown, it is more typical that a number of individual wedges are employed and spaced equidistantly around the hub 12. The mounting wedges 22 effectively force the outer rim assembly 16 against the cylindrical spacer assembly 17 which, in turn, is forced against the inner rim which abuts against the hub 12.

The outer rim assembly 16 of the dual rim assembly includes a cylindrical rim member 26 defining a base upon which the outer tire 18 and associated rim elements are generally mounted. The lateral right-hand edge of the base member 26 which is not shown in FIG. 2 can be equipped with an annular tire bead flange which is either fixed to the base member 26, or also removable therefrom. The opposing lateral edge of the base member 26 defines a gutter band edge 28 having an O-ring groove 30 for accommodating an elastomeric O-ring 32. The gutter band edge 28 of the rim member 26 further includes an upper lock-ring groove 34 for locking engagement with a lock ring 36. The lower surface of the gutter band 28, under the lock-ring groove 34, is constructed with opposing inclined surfaces 38 and 40. The outer inclined surface 38 is formed generally at an angle of about 28° with respect to the general planar surface of the cylindrical rim member 26. The inner inclined surface 40 of the gutter band 28 is constructed so as to define an angle of about 28°, also with respect to the cylindrical rim member 26. The particular angular configurations of the wedges are not essential to the functions, and thus other angles can be utilized. The inner inclined surface 40 of the gutter band 28 forms a complementary angle with the inclined surface 42 of the mounting wedge 22. With this construction, as the mounting wedge 22 is moved laterally to the left, as a result of tightening of the bolt 14, the wedge surfaces 40 and 42 engage, whereupon the gutter band edge 28 of the outer rim is forced radially outwardly. If the outer rim is prevented from moving laterally to the left due to abutment with the inner rim and cylindrical spacer assembly 17, then the lateral movement of each of the mounting wedges 22 is effective to tighten the outer rim assembly 16 (and the inner rim assembly) and fix both rim assemblies with respect to the hub 12.

Figure 3:
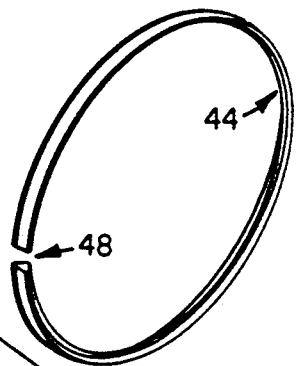
FIG. 3 illustrates an isometric view of the split wedge support ring of the invention.

In accordance with an important feature of the invention, a support wedge ring 44 is disposed about the hub 12 as either a separate item, and includes an incline surface 46 having an angle complementary to that of the outer inclined surface 38 of the gutter band 28. The support wedge ring 44, when provided as a separate element, is split, as shown in FIG. 3. Essentially, the support wedge ring 44 is split at location 48 such that a space of about one-half inch exists between the ends of the relaxed ring 44. The space between the ends of the support wedge ring 44 should be of sufficient distance such that when such ring 44 is wedged with respect to the gutter band 28 and the hub 12, the ends of the support wedge ring 44 are brought together, but do not abut each other. As will be described in more detail below the support wedge ring 44 can be constructed integral with the cylindrical spacer 50.

As noted in FIG. 2, the rigid cylindrical spacer 50 is disposed between corresponding support wedge rings 44 of each dual rim assembly, thereby preventing lateral movement of each such support wedge ring 44 when such rim assemblies are fixed to the hub 12. As can be appreciated, when the mounting wedges 22 are secured to the hub 12 by way of the bolts 14, both inclined surfaces 42 and 46 of the respective wedges 22 and 44 cause the gutter band edge 28 of the rim to be pushed radially outwardly and spaced somewhat from the hub 12 at location 52. Because of this spacing between the gutter band edge 28 and the hub 12 when the outer rim assembly 16 is securely mounted to the hub 12, and were it not for the support wedge ring 44, the gutter band edge 28 would be entirely unsupported under the lock-ring groove 34. As a result of such unsupported structure, large bending forces can be experienced at the bottom of the lock-ring groove 34 which often result in cracking of the gutter band edge 28. However, the support wedge ring 44 wedged between the hub 12 and the gutter band 28 provides annular support in the area generally under the lock-ring groove 34, thereby substantially reducing the bending forces. Depending on the type of hub on which the rim assembly of the invention is mounted, certain modifications may have to be made to the hub to assure that the support wedge ring rests on a portion of the hub or other structure so that wedging action can occur. With the construction of the rim assembly shown in FIG. 2, metal cracking adjacent the lock-ring groove 34 is a possibility, if at all, due to shear forces, which forces must be substantially larger than the noted bending forces. In accordance with another feature of the invention, the support wedge ring 44 does not interfere with the mounting scheme by which the rim assembly 16 and tires 18 are normally mounted to the hub 12 with respect to the inner rim assembly and tire.

The outer rim assembly 16 of the invention includes other conventional apparatus, including a bead seat band 54 and a removably side-ring flange 56. The inside vertical surface of the side-ring flange 56 as well as an upper lateral surface of the bead seat band support the bead and sidewall section 60 of the tire 18. The outer rim assembly 16 is illustrated in FIG. 2 as it would appear with the tire 18 fully mounted and inflated on such assembly. In such a condition, the bead and sidewall section 60 of the tire 18 exert a lateral force on the side-ring flange 56. However, the annular edge of the side-ring flange 56 abuts against a shoulder 62 of the bead seat band 54. The bead seat band 54 is, in turn, wedged against the lock ring 36 at surfaces 64. The lock ring 36 is anchored with respect to the gutter band edge 28 by an annular lip 68 of the lock ring 36 being disposed within the lock-ring groove 34. Because the lock ring 36 is anchored to the gutter band edge 28 of the rim member 26, and due to the locking nature of the bead seat band 54 and the side-ring flange 56, the tire bead 60 cannot move laterally. The O-ring 32 is squeezed between the bead seat band 54 and the annular O-ring groove 30, thereby preventing escape of air and accommodating tubeless tires.

In the preferred embodiment of the invention, the support wedge ring 44 is constructed of a high tensile strength steel, as is the gutter band edge 28 of the rim member 26. The lock ring 36, the bead seat band 54 and the side-ring flange 56 are constructed with materials well-known in the art for such purpose. In order to provide lateral rigidity and support with respect to the wedge support ring 44, the cylindrical spacer ring 50 is constructed of steel stock of about ⅜ inch thick. When employed with separate annular split wedge support rings 44, the cylindrical spacer 50 need not be split. While the support wedge ring 44 and the cylindrical spacer 50 are illustrated in FIG. 2 as separate elements, such elements can be formed together as a unitary item and utilized in connection with dual wheels.

Demounting of the outer tire 18 is accomplished in the following manner. The outer tire 18 and outer rim 16 are first removed from the hub 12 by removing each of the bolts 14 as well as each of the mounting wedges 22. The outer tire and rim can then be completely removed from the hub 12, as can the cylindrical spacer assembly 17, the inner tire and associate rim assembly. Next, air is removed from the tire via a valve stem, not shown. Then, the side-ring flange 56 is compressed inwardly, as is the bead seat band 54. This removes lateral pressure from the lock ring 36, thereby allowing it to be removed from the lock-ring groove 34. As is well-known in the art, the lock ring 36 is split, thereby allowing it to be forced radially outwardly from the lock-ring groove 34 and removed entirely from the gutter band 28. After the lock ring 36 is removed, the bead seat band 54 and the side-ring flange 56 can be removed from the rim assembly 16, thereby also allowing the tire 18 to be dismounted from the rim. Mounting of the tire 18 on the rim assembly 16 is accomplished by reversing the steps noted above.

With reference now to FIGS. 4 and 5, there is more particularly illustrated an embodiment of the invention adapted for vehicles utilizing dual wheels 18 and 70. The electric motor hub 12, or other hub structure, is generally axially elongate to accommodate a pair of inner and outer rim assemblies 16 and 72. The rim assemblies 16 and 72 are held spaced apart by an integral cylindrical spacer 80 having tapered edges. The tapered edges define wedge supports similar to the wedge support ring described above. Generally, the rim assemblies 16 and 72 can be identically constructed, except one being reversed when mounted to the hub 12. The wheel hub 12 includes an inclined annular shoulder 74 against which an inside inclined surface 76 of the gutter band 78 abuts. Thus, the inside tire 70 and rim assembly 72 are first slipped over the hub 12 until the gutter band inclined surface 76 abuts with the hub shoulder 74. Then, the cylindrical spacer 80 having formed on the opposing annular edges thereof the wedge supports 82 and 84, is slipped over the hub 12. The cylindrical spacer 80 may be unitary in construction as shown, by forming together, or welding a pair of support wedge rings 44 and the spacer 50 of the type shown in FIG. 2. When constructed as a unitary item, the cylindrical spacer 80 is completely split, or partially split on opposing edges, to accommodate radial expansion during mounting of the dual tires to the hub 12. FIG. 5 illustrates the cylindrical spacer 80 with opposing annular edges constructed to include integral support wedges 82 and 84. The cylindrical spacer 80 is split, as noted by numeral 83.

With reference again to the mounting of the dual rims, the outer tire 18 and rim assembly 16 are next slipped onto the hub 12, and each of the mounting wedges 22 is loosely attached to the hub 12 by the bolts 14. The bolts 14 are uniformly tightened so that the outer rim assembly 16 is moved uniformly toward the other rim assembly 72. By successively tightening each hub bolts 14, the wedge portion of each mounting wedge 22 engages the inside inclined surface of the gutter band 28 and thereby moves the entire rim assembly 16 inwardly on the hub 12. Such inward movement causes the outside inclined surface of the gutter band 28 to bear against the spacer ring support wedge 82, thereby moving the cylindrical spacer 80 further inwardly. The inward movement of the spacer 80, in turn, causes the opposing support wedge 84 to bear against the outside inclined surface of the gutter band 78 of the inside rim assembly 72. The continued movement of the rim assemblies 16 and 72, occasioned by the tightening of the bolts 14, causes both rims to be tightly secured to the hub 12. Importantly, the spacer 80, together with the support wedges 82 and 84, provide support to both gutter bands 28 and 78, in an area generally below the respective lock-ring grooves, thereby reducing bending forces and the tendency of the gutter bands to become fatigued and cracked.

Also as noted in FIG. 4, fittings 86 and 88 can be threadably fastened into each cylindrical rim member 26, and connected together by a common tube 90 so that both tires 18 and 70 can be inflated or deflated simultaneously. The tube 90 can be routed through a bore (not shown) in the hub 12. A valve stem 92 is provided on the outside rim assembly 16 for ready access by a repair person.

From the foregoing, disclosed is an improved dual rim assembly which substantially reduces or eliminates stress cracks in the gutter band. A technical advantage of the invention is that a spacer assembly having opposing annular support wedges can be employed with dual rim assemblies and tires on a heavy duty vehicle. Another technical advantage of the invention is that by providing support under the gutter band edge of each dual rim, metal stresses are eliminated, as are cracks, thereby decreasing danger to personnel as well as damage to equipment. Yet another technical advantage of the invention is that by forming support wedges on a cylindrical spacer, lateral movement thereof is allowed during mounting of an outside tire of a dual tire vehicle, so that both of the tires can move laterally and be clamped together by the action of the various wedge surfaces.

While the preferred and other embodiments of the invention have been disclosed with reference to a specific dual rim assembly, it is to be understood that many changes in detail may be made as a matter of engineering choices to either the rim assemblies or the wheel hubs without departing from the spirit and scope of the invention, as defined by the appended claims.

What is claimed is:

1. In a dual tire rim assembly adapted for mounting on a wheel hub, each rim assembly being of the type having at least one annular sidewall flange removable for mounting and demounting a tire from a respective said rim, a grooved gutter band, and an annular lock ring engageable with a groove on the respective gutter band for locking the sidewall flange to the respective rim assembly, inner and outer annular inclined surfaces on each said gutter band, the improvement comprising, an annular spacer having opposing annular edges each constructed as a rigid support wedge, the spacer being disposed between said rim assemblies, said opposing annular support wedges of said spacer being wedged between the respective inner inclined surfaces of said gutter bands and a portion of the hub during mounting of said rim assemblies to said hub, and said outer inclined surfaces of each said gutter band being engageable with other inclined structures to thereby fix said rim assemblies with respect to said hub, each said gutter band and the associated rim being fixed with respect to the hub by being forced radially outwardly by wedge action of said annular support wedges between the respective inner inclined surfaces of the gutter bands and the hub and by the engagement of said other inclined structures with the respective outer inclined surfaces of the gutter bands.

2. The improved dual rim assembly of claim 1, wherein said spacer is split.

3. The improved dual rim assembly of claim 1, wherein each said annular support wedge is split.

4. A dual tire rim assembly adapted for mounting to a hub, comprising:

a rim member associated with each said rim assembly for supporting a respective inflatable tire, each said rim member having mountable along one annular edge thereof a gutter band with an annular lock-ring groove and inner and outer opposing annular inclined surface, said inner inclined surface of each said gutter band defining a surface to which a wedging force is applied to provide support to the lock ring groove;

a pair of opposing annular side-ring flanges associated with each said rim assembly for providing lateral support to respective tire beads;

an annular bead seat band associated with each said rim assembly, and having a flanged edge for laterally supporting a respective said side-ring flange;

a pair of lock rings, each having an annular lip mateable with the annular groove of a respective said gutter band, said lock rings each having a surface adapted for bearing against a respective said bead seat band to laterally support each said bead seat band; and an annular cylindrical spacer having annular edges each defining a rigid support wedge, each said support wedge being wedgeable against a respective inner inclined surface of the gutter bands so that when an opposing axial wedging force is applied to the outer inclined surfaces of the respective gutter bands during mounting to said hub, the spacer is compressed between said rim assemblies, and the inner and outer inclined surface of each said gutter band wedges with a respective said rigid support wedge and said axial wedging force, thereby supporting said gutter bands and fixing each said rim assembly to said hub.

5. The dual tire rim assembly of claim 4, wherein each said support wedge comprises an annular structure with a break therein, and said rigid spacer bears against each said support wedge to thereby anchor said support wedges with respect to said hub.

6. The dual tire rim assembly of claim 4, wherein the rigid spacer is split.

7. A method for reducing metal fatigue is respective gutter band edges of dual rim assemblies of the type having respective removable sidewall flanges and lock rings engageable in an annular groove in the respective gutter bands, and each rim assembly having an inner inclined surface generally under the lock ring groove, and an outer inclined surface opposing the respective inner inclined surface, comprising the steps of:

providing an annular spacer structure having opposing rigid annular wedges encircleable about a hub to which said rim assemblies are to be mounted;

disposing the annular spacer structure between the rim assemblies around the hub and in engagement therewith so that when each said rim assembly is axially forced together on the hub and the rigid annular wedges are compressed and wedged between the hub and the respective inner annular inclined surfaces of the gutter bands;

forcing the opposing rigid annular wedges under the respective inner inclined surfaces of said rim assemblies so that each said rigid annular wedge engages with a respective said gutter band inner inclined surface and provides support against radial inward movement with respect to said lock-ring grooves; and maintaining a wedging force on said opposing rigid annular wedges by way of bolts and other outer wedge structures to maintain each said rim assembly fixed to said hub through wedging action of the respective inner inclined surfaces of said rim assemblies and the rigid annular wedges of the annular spacer, and the outer inclined surfaces of the rim assemblies and the other outer wedge structures.

8. The method of claim 7, further including forming in each rigid annular wedge a split to accommodate a radial change in dimension.

9. The method of claim 7, further including forming said spacer rigid for maintaining said dual rims separated, and forming said rigid annular wedges around opposing edges of said spacer.

10. The method of claim 7, further including supporting the inner said rim assembly by a first wedging action between the hub and the inner rim assembly where said hub defines one said other outer wedge structure, and a second wedging action between the inner rim assembly and the rigid annular wedge associated with said annular spacer structure.

11. The method of claim 10, further including supporting the outer said rim assembly by a first wedging action between said outer rim assembly the rigid annular wedge associated with said annular spacer structure, and a second wedging action between said outer rim assembly and a mounting wedge defining the other outer wedge structure which is threadably anchored to said hub by said bolts to draw the outer rim assembly toward the inner rim assembly with the annular spacer structure compressively held therebetween.

* * * * *

UNITED STATES PATENT AND TRADEMARK OFFICE
CERTIFICATE OF CORRECTION

PATENT NO. : 5,083,597
DATED : January 28, 1992
INVENTOR(S) : Jimmie J. France

It is certified that error appears in the above-identified patent and that said Letters Patent is hereby corrected as shown below:

Column 1, Line 5, before "BACKGROUND OF THE INVENTION," insert therefore:
--TECHNICAL FIELD OF THE INVENTION
The present invention relates in general to rims adapted for mounting pneumatic tires thereto, and more particularly to the rims of the type having at least one sidewall flange thereof removable.--.

Column 10, Line 6, after "assembly" insert therefore --and--.

Signed and Sealed this

Twenty-seventh Day of April, 1993

Attest:

MICHAEL K. KIRK

*Attesting Officer*    *Acting Commissioner of Patents and Trademarks*